US009586490B2

(12) United States Patent
Yamamaru et al.

(10) Patent No.: US 9,586,490 B2
(45) Date of Patent: Mar. 7, 2017

(54) CHARGING PORT STRUCTURE

(71) Applicant: Nissan Motor Co., Ltd., Yokohama-shi, Kanagawa (JP)

(72) Inventors: Junichi Yamamaru, Ebina (JP); Kyouhei Kawasaki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 171 days.

(21) Appl. No.: 14/417,815

(22) PCT Filed: Aug. 29, 2013

(86) PCT No.: PCT/JP2013/073224
§ 371 (c)(1),
(2) Date: Jan. 28, 2015

(87) PCT Pub. No.: WO2014/045830
PCT Pub. Date: Mar. 27, 2014

(65) Prior Publication Data
US 2015/0151645 A1 Jun. 4, 2015

(30) Foreign Application Priority Data

Sep. 19, 2012 (JP) .................................. 2012-205532

(51) Int. Cl.
*H02J 7/00* (2006.01)
*B60L 11/18* (2006.01)
(Continued)

(52) U.S. Cl.
CPC .......... *B60L 11/1818* (2013.01); *B60K 15/05* (2013.01); *B60L 11/123* (2013.01);
(Continued)

(58) Field of Classification Search
CPC ...................................................... Y02T 90/14
(Continued)

(56) References Cited

U.S. PATENT DOCUMENTS

2002/0115319 A1   8/2002   Mori
2007/0046062 A1   3/2007   Yoshimura
2012/0268062 A1   10/2012  Yoneda

FOREIGN PATENT DOCUMENTS

JP      50-21822 U        3/1975
JP      2007-153011 A     6/2007
(Continued)

*Primary Examiner* — Suresh Memula
(74) *Attorney, Agent, or Firm* — Global IP Counselors, LLP

(57) ABSTRACT

A charging port structure includes a guide plate, and is configured such that a release lever of a port cap can be prevented from being exposed to water even when water has flowed into a port housing. The guide plate receives water that has flowed into a port housing from the periphery of a port lid for covering a forward opening part of the port housing so as to be capable of opening and closing. The port housing surrounds a charging port having an end connection to which a charging connector for supplying electric power from an outside power source is connected, and guides the water away from where the release lever is disposed for opening the port cap for covering the end connection of the charging port so as to be capable of opening and closing. The guide plate is disposed above the charging port.

10 Claims, 11 Drawing Sheets

(51) Int. Cl.
 *B60K 15/05* (2006.01)
 *B60L 11/12* (2006.01)
 *B60L 11/14* (2006.01)
 *B60K 1/04* (2006.01)

(52) U.S. Cl.
 CPC .............. *B60L 11/14* (2013.01); *B60L 11/185* (2013.01); *B60L 11/1877* (2013.01); *B60K 2001/0438* (2013.01); *B60K 2015/053* (2013.01); *B60K 2015/0576* (2013.01); *Y02T 10/6217* (2013.01); *Y02T 10/705* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01)

(58) Field of Classification Search
 USPC ........................................................ 320/109
 See application file for complete search history.

(56) References Cited

FOREIGN PATENT DOCUMENTS

| | | | |
|---|---|---|---|
| JP | 2007153011 A | * | 6/2007 |
| JP | 2010-288363 A | | 12/2010 |
| JP | 2011-229303 A | | 11/2011 |
| JP | 2012-49011 A | | 3/2012 |
| JP | 2012-130189 A | | 7/2012 |
| JP | 2012-131397 A | | 7/2012 |

* cited by examiner

CHARGING PORT STRUCTURE

CROSS-REFERENCE TO RELATED APPLICATIONS

This application is a U.S. National stage application of International Application No. PCT/JP2013/073224, filed Aug. 29, 2013, which claims priority to Japanese Patent Application 2012-205532 filed in Japan on Sep. 19, 2012, the contents of each of which are hereby incorporated herein by reference.

BACKGROUND

Field of the Invention

The present invention relates to a charging port structure in which a front opening part of a port housing disposed inside a charging port is covered by a port lid.

Background Information

There is known in the art a charging port structure in which a charging port is disposed in a port housing of an electric vehicle, and a front opening part of the port housing is covered by a port lid capable of opening and closing (see Japanese Laid-Open Patent Application No. 2010-288363, for example).

SUMMARY

However, in a conventional charging port structure, there is the risk of the charging port in the port housing being exposed to water when water trickles along a vehicle body surface from above the port housing flows into the port housing.

In particular, problems occur in that a release lever for opening a port cap for covering an end connection of the charging port is exposed to water, and when the water freezes, the port cap is difficult to open.

The present invention was developed in view of the foregoing problems, and an object of the present invention is to provide a charging port structure whereby it is possible to prevent the release lever of the port cap from being exposed to water when water flows into the port housing.

In order to achieve the above objective, the charging port structure of the present invention includes a charging port, a port housing, a port lid, a port cap, a release lever, and a guide means (device).

The charging port has an end connection to which a charging connector for supplying electric power from an outside power source is connected.

The port housing surrounds the charging port.

The port lid covers a front opening part of the port housing so as to be capable of opening and closing.

The port cap covers the end connection of the charging port so as to be capable of opening and closing.

The release lever is provided to a peripheral edge part of the end connection of the charging port and opens the port cap.

The guide means is provided above the charging port, and receives water that has flowed into the port housing from above the port lid and guides the water away from where the release lever is provided.

In the charging port structure of the present invention, water that has flowed into the port housing from above the port housing is received by the guide means and guided away from where the release lever is provided.

It is therefore possible to prevent the release lever of the port cap from being exposed to water when water has flowed into the port housing, and to prevent opening of the port cap from becoming difficult due to freezing of the water.

BRIEF DESCRIPTION OF THE DRAWINGS

Referring now to the attached drawings which form a part of this original disclosure.

DETAILED DESCRIPTION OF EMBODIMENTS

Figure 1:
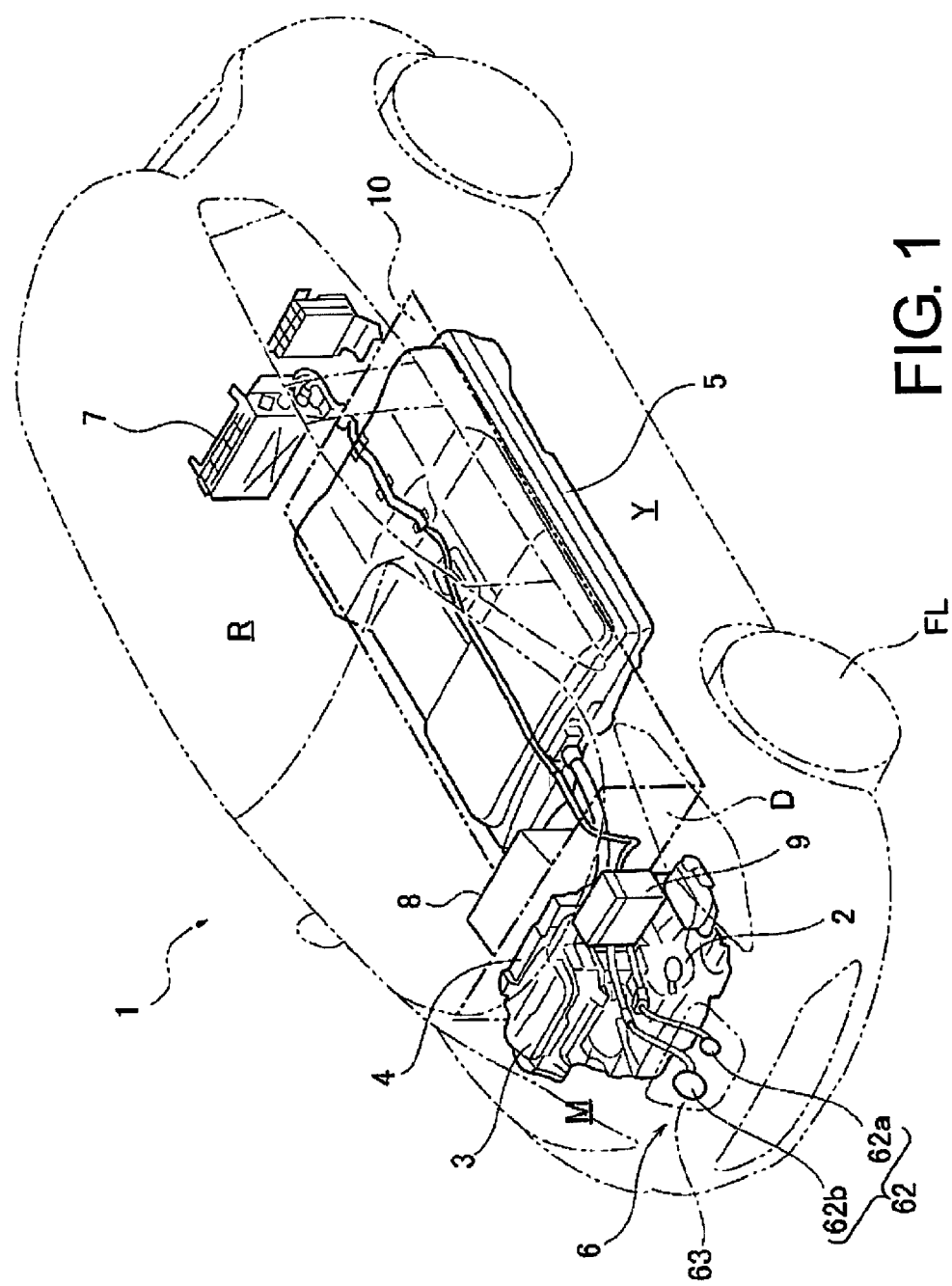
FIG. 1 is an overall perspective view illustrating the main structure of an electric automobile to which the charging port structure of Example 1 is applied.

An embodiment of the charging port lid structure of the present invention is described below on the basis of Example 1 illustrated in the drawings.

EXAMPLE 1

The description of the configuration of the charging port lid structure of Example 1 is divided into descriptions of the "overall configuration of the electric automobile," the "configuration of the front part of the vehicle body of the electric automobile," the "configuration of the charging port unit," and the "configuration of the guide plate."

Overall Configuration of the Electric Automobile

FIG. 1 is an overall perspective view illustrating the main structure of an electric automobile to which the charging port lid structure of Example 1 is applied. The overall configuration of the electric automobile of Example 1 is described below on the basis of FIG. 1.

As illustrated in FIG. 1, the electric automobile (electric vehicle) 1 of Example 1 is provided with a drive motor 2, a drive motor inverter 3, a DC/DC junction box 4, a battery pack 5, a charging port unit 6, an onboard charger 7, and an air conditioning unit 8. The component indicated by reference numeral 9 in FIG. 1 is a 12-volt onboard battery.

The drive motor 2 is a travel drive source for the electric automobile 1, and is disposed in a motor compartment M provided in a vehicle front. An output shaft (not illustrated) of the drive motor 2 is connected to left and right front wheels FL, (other wheel not illustrated) which are drive wheels. The drive motor 2 performs a driving action for generating a drive torque using discharged electric power from the battery pack 5 when a positive torque command is outputted to the drive motor inverter 3, and drives the left and right front wheels FL, (other wheel not illustrated) (powering). When a negative torque command is outputted to the drive motor inverter 3, an electric power generation action is performed for converting rotational energy from the left and right front wheels FL, (other wheel not illustrated) into electrical energy, and the generated electric power is used as charging electric power for the battery pack 5 (regeneration).

The DC/DC junction box 4 houses a DC/DC converter, and distributes high-voltage discharge electric power from the battery pack 5 to supply electric power to a 12-volt power source system and charge the 12-volt onboard battery 9. The DC/DC junction box 4 also has a normal charging relay and a quick charging relay, and is configured so as to be able to switch charging circuits according to charging mode.

The battery pack 5 is positioned at the center of a wheelbase under a floor panel 10 for partitioning a passenger compartment space (passenger compartment) R and an underfloor space Y, i.e., in the underfloor space Y. The battery pack 5 serves as an electric power source for the drive motor 2 and as an electric power source for a PTC heater (not illustrated) housed in the air conditioning unit 8.

The charging port unit 6 is disposed at the center of the vehicle front in a location where a charging connector is connected for supplying electric power from a charging stand, household charging facility, or other outside power source. The charging port unit 6 has a charging port 62 having a normal charging port 62a and a quick charging port 62b, and an openable/closable port lid 63 for covering the charging port 62. The normal charging port 62a is a charging port used when charging through use of a household charging facility, a normal charging stand, or the like, and is connected to the DC/DC junction box 4 via the onboard charger 7. The quick charging port 62b is a charging port used when charging through use of a quick charging stand or the like, and is directly connected to the DC/DC junction box 4. The structure of the charging port unit 6 is described in detail hereinafter.

The air conditioning unit 8 is disposed above the floor panel 10, i.e., in the passenger compartment space R in front of the battery pack 5. Here, the air conditioning unit 8 is disposed between a dash panel D for partitioning the motor compartment M and the passenger compartment space R, and an instrument panel not illustrated in the drawing. The air conditioning unit 8 blows temperature conditioning air into the passenger compartment space R.

Configuration of the Front Part of the Vehicle Body of the Electric Automobile

Figure 2:
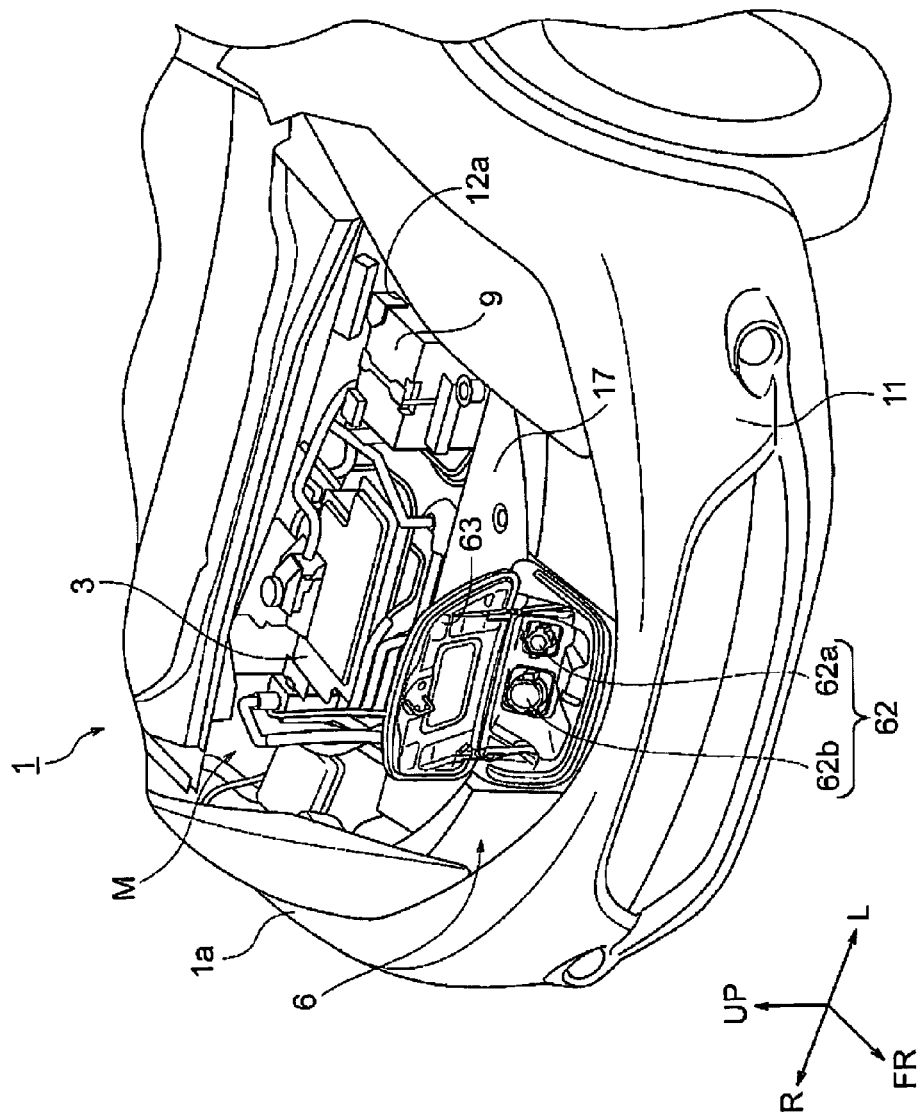
FIG. 2 is a perspective view illustrating the front part of the vehicle body of the electric automobile of Example 1.
Figure 3:
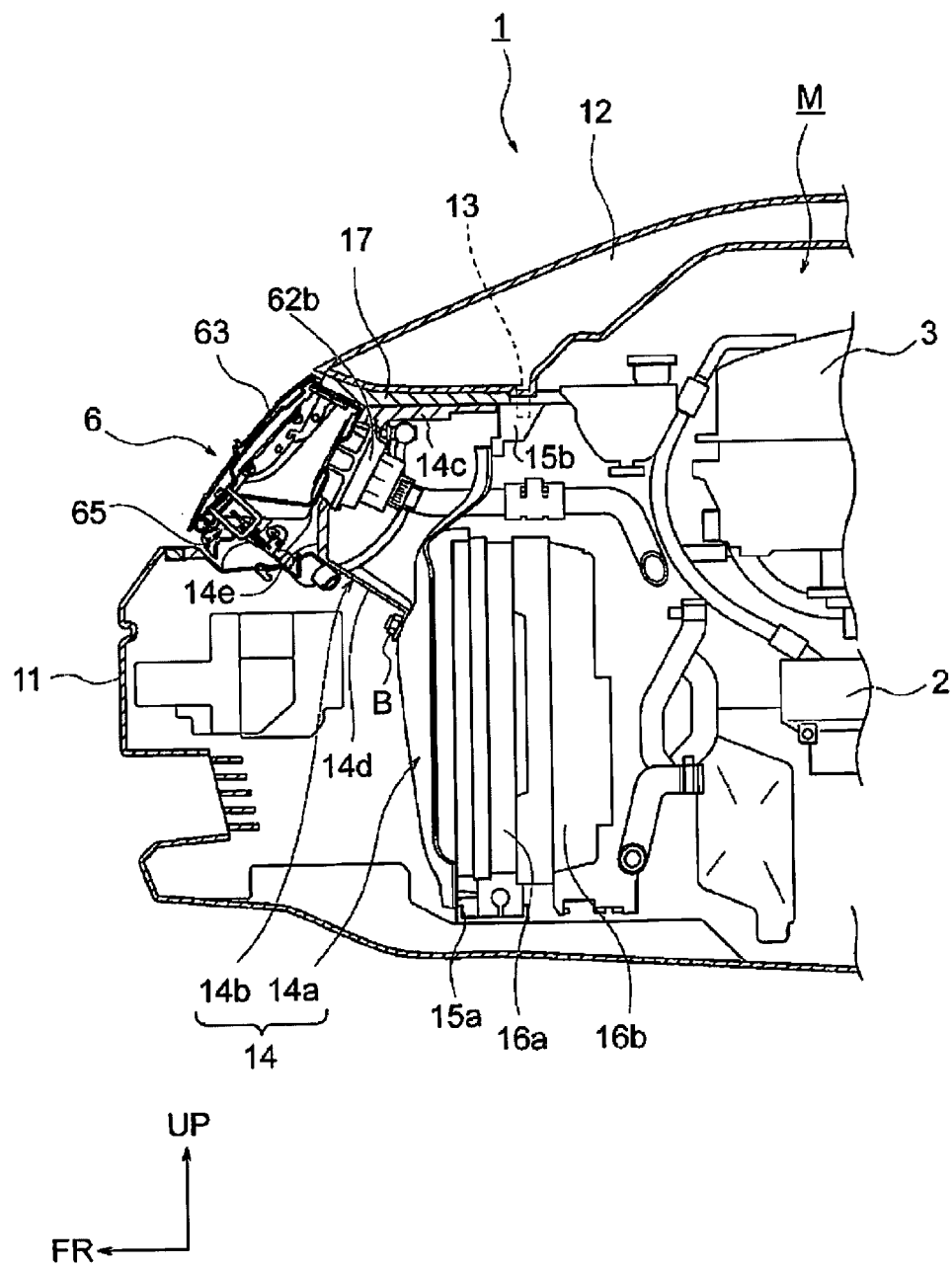
FIG. 3 is a longitudinal sectional view illustrating the front part of the vehicle body of the electric automobile of Example 1.
Figure 4:
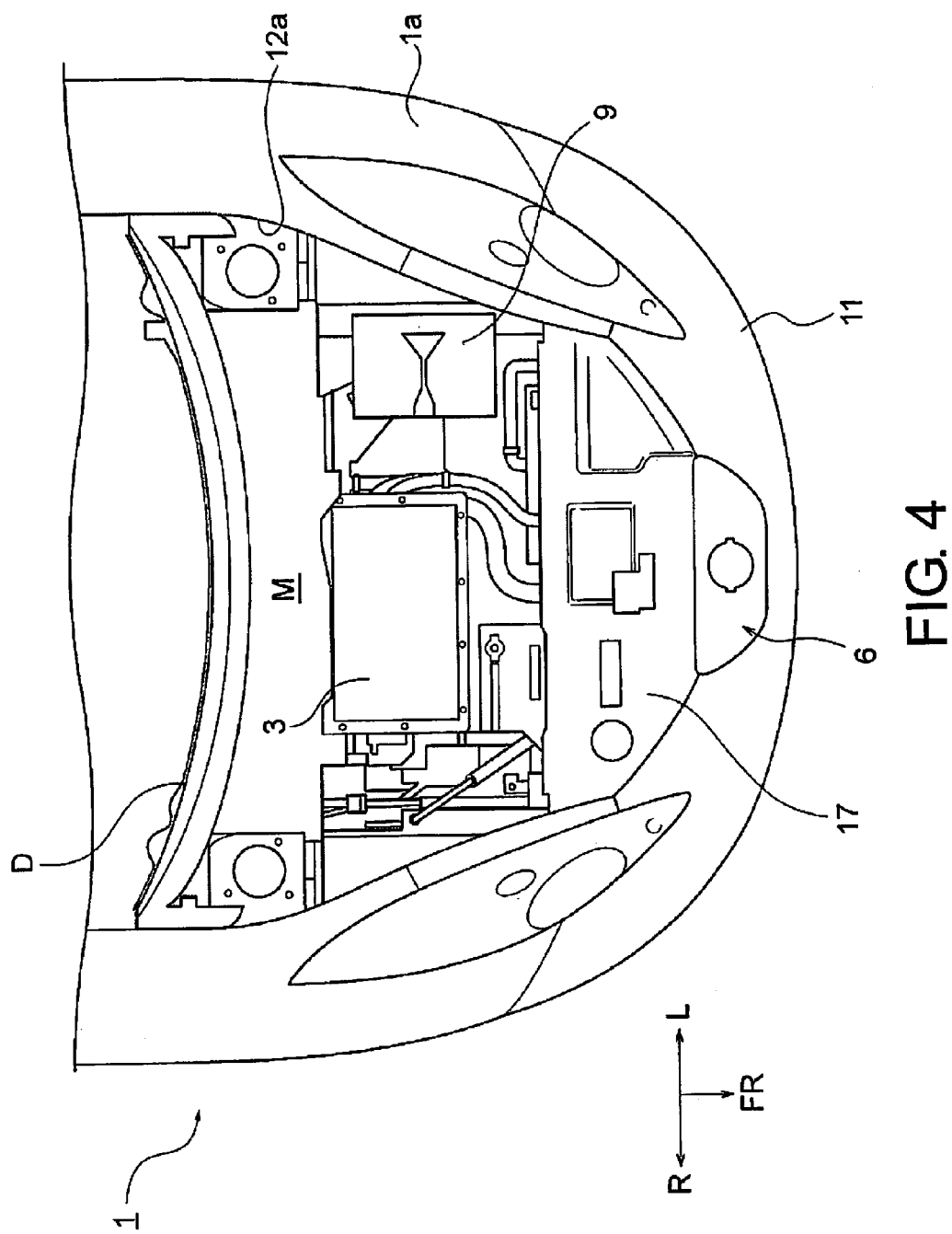
FIG. 4 is a plan view illustrating the front part of the vehicle body of the electric automobile in a state in which the front hood is open in Example 1.

FIG. 2 is a perspective view illustrating the front part of the vehicle body of the electric automobile of Example 1. FIG. 3 is a longitudinal sectional view illustrating the front part of the vehicle body of the electric automobile of Example 1. FIG. 4 is a plan view illustrating the front part of the vehicle body of the electric automobile in a state in which the front hood is open in Example 1. The configuration of the front part of the vehicle body of the electric automobile of Example 1 is described below on the basis of FIGS. 2 through 4.

In the electric automobile 1 of Example 1, the motor compartment M is formed in the front part of the vehicle body, and a bumper 11 is disposed on a bottom part of a front side of the motor compartment M so as to extend along the vehicle width direction. The charging port unit 6 is disposed on a top side of the bumper 11 at a center part in the vehicle width direction thereof.

The motor compartment M is a vehicle-body internal space formed on the inside of an outer panel (vehicle body surface) 1a of the front part of the vehicle body, and has a compartment opening part 12a open in the vehicle-upward direction. The compartment opening part 12a is covered so as to be openable/closable by a front hood 12 (see FIG. 3). A hood locking mechanism 13 for keeping the front hood 12 closed is disposed between the compartment opening part 12a and the front hood 12. The hood locking mechanism 13 can be unlocked by an operation from inside the passenger compartment space R, access to the inside of which is restricted by a door locking mechanism or the like. The detailed configuration of the hood locking mechanism 13 is well known, and therefore will not be described herein.

The drive motor inverter 3 is disposed in a center part of the motor compartment M, and the 12-volt onboard battery 9 is disposed on a vehicle-left side of the drive motor inverter 3 (see FIG. 2). As illustrated in FIG. 3, the drive motor 2 is disposed below the drive motor inverter 3, and the DC/DC junction box 4 (not illustrated) is disposed on a vehicle-rear side of the drive motor inverter 3.

As illustrated in FIG. 3, the charging port unit 6 is supported on a vehicle-front side of the motor compartment M by a charging port bracket 14 standing at the front side of the motor compartment M. Specifically, as illustrated in FIG. 4, the charging port unit 6 is disposed in a vehicle-body front end 1b of the electric automobile 1, and is disposed in a region further toward the front of the vehicle than the range of view obtainable when looking into the compartment opening part 12a.

The "range of view obtainable when looking into the compartment opening part 12a" is the viewable range from the direction in which the compartment opening part 12a opened in the vehicle-upward direction is open, i.e., from above the vehicle, and is a range (inside of the open region) facing the compartment opening part 12a.

Here, since an air guide 17 is disposed inside the compartment opening part 12a, a front portion of the compartment opening part 12a is covered. Specifically, the "range of view obtainable" in Example 1 is the range of view obtainable when viewing the portion of the compartment opening part 12a not covered by the air guide 17.

The charging port bracket 14 is erected between a lower cross member 15a and an upper cross member 15b, and has a vertical retainer 14a and a support plate 14b.

The vertical retainer 14a is a framework member erected at a center part in the vehicle width direction of the lower cross member 15a. An outdoor heat exchanger 16a for exchanging heat between traveling wind and a coolant flowing through an evaporator in the air conditioning unit 8, or a fan unit 16b or the like is disposed between the vertical retainer 14a and the drive motor 2.

The support plate 14*b* is a framework member attached to a top part of the vertical retainer 14*a*. The support plate 14*b* has a horizontal top wall 14*c*, a bottom end wall 14*d*, and a port support wall 14*e* for connecting the horizontal top wall 14*c* and the bottom end wall 14*d* to each other and supporting the charging port unit 6. A distal-end part of the horizontal top wall 14*c* oriented in the vehicle rear direction is fixed to the upper cross member 15*b*. The bottom end wall 14*d* is fixed to the vertical retainer 14*a* by a bolt B. Through holes (not illustrated) through which the normal charging port 62*a* and the quick charging port 62*b* each pass are also formed in the port support wall 14*e*.

An air guide 17 is disposed inside the compartment opening part 12*a*. The air guide 17 restricts the flow direction of air flowing through the motor compartment M and prevents the inside of the motor compartment M from being exposed to the outside. The air guide 17 is detachably mounted to the top side of the horizontal top wall 14*c*, and the air guide 17 covers a front part of the compartment opening part 12*a* in the vicinity of the charging port unit 6.

Configuration of the Charging Port Unit

Figure 5:
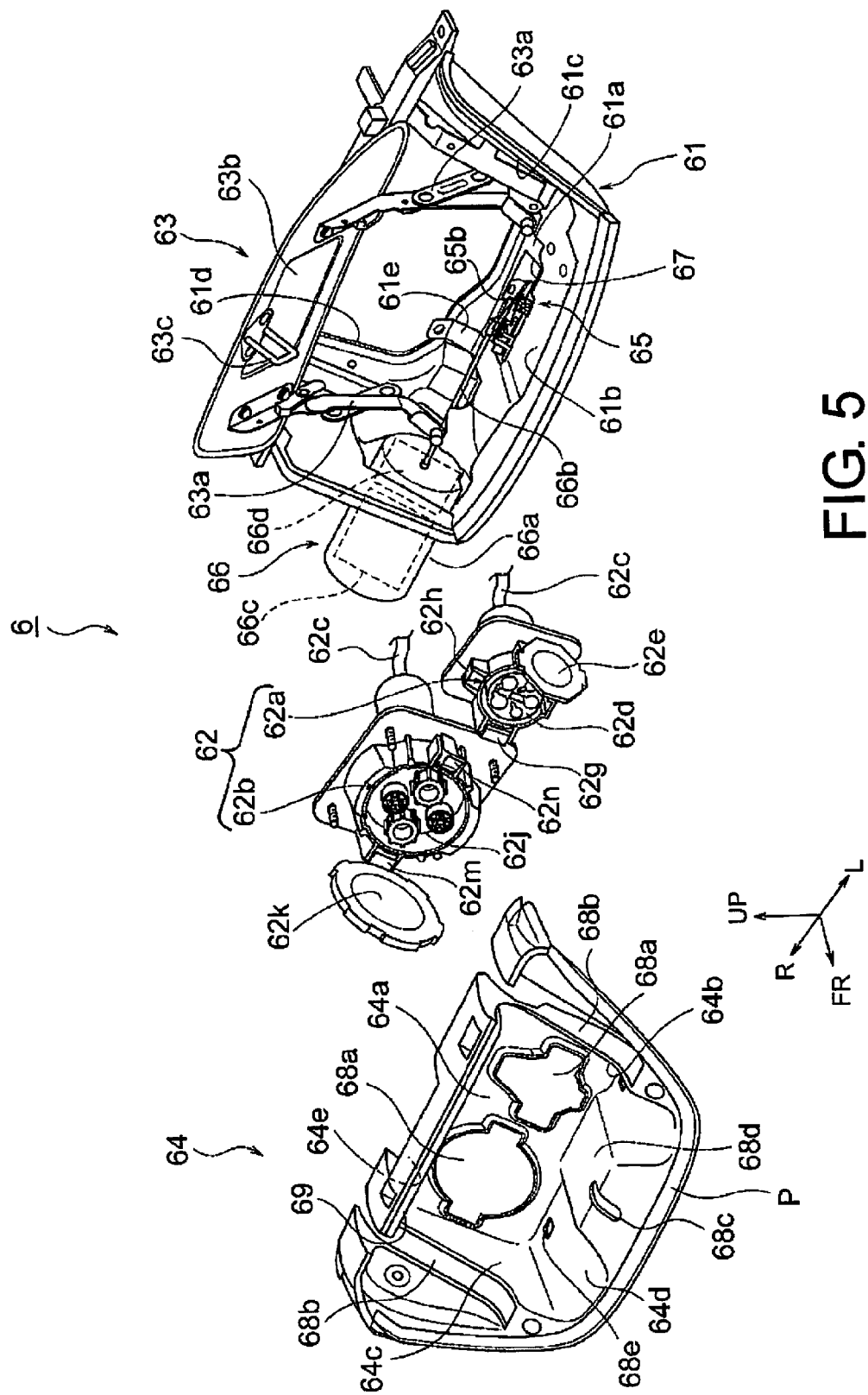
FIG. 5 is an exploded perspective view illustrating the charging port unit in a state in which the port lid is open in Example 1
Figure 6:
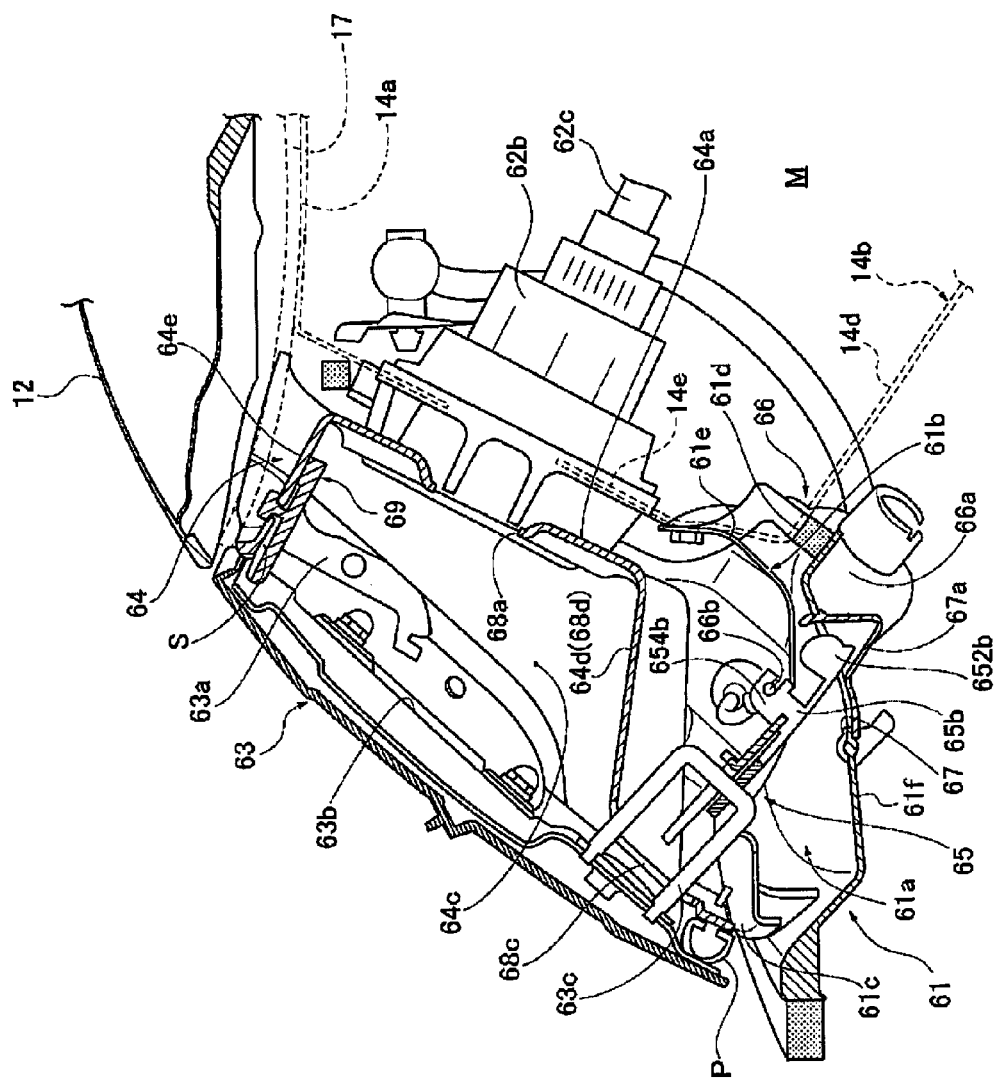
FIG. 6 is a longitudinal sectional view illustrating the charging port unit of Example 1.
Figure 7A:
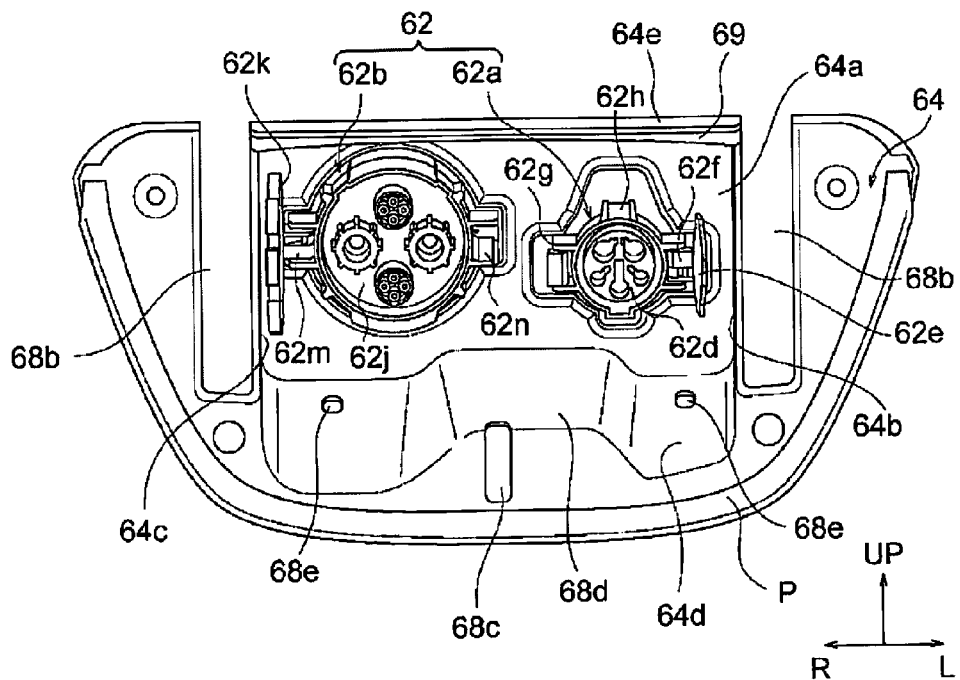
FIG. 7A is a front view illustrating the inside of a port housing in a state in which the port cap is open.
Figure 7B:
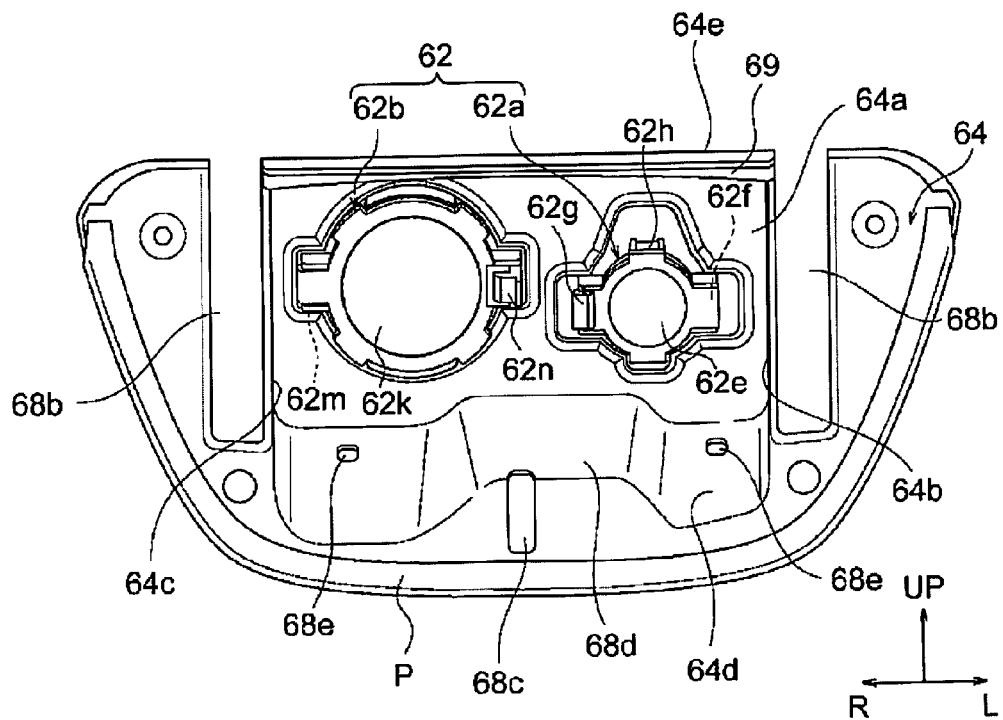
FIG. 7B is a front view illustrating the inside of the port housing in a state in which the port cap is closed.

FIG. 5 is an exploded perspective view illustrating the charging port unit in a state in which the port lid is open in Example 1. FIG. 6 is a longitudinal sectional view illustrating the charging port unit of Example 1. FIG. 7A is a front view illustrating the inside of a port housing in a state in which a port cap is open, and FIG. 7B is a front view illustrating the inside of the port housing in a state in which the port cap is closed. In the drawings, UP indicates the vehicle-upward direction, FR indicates the vehicle-forward direction, L indicates the vehicle-leftward direction, and R indicates the vehicle-rightward direction. The configuration of the charging port unit is described below on the basis of FIGS. 5 through 7B.

As illustrated in FIGS. 5 and 6, the charging port unit 6 has a port housing 61, the charging port 62, the port lid 63, a port cover 64, a port lid locking mechanism 65, an electric unlocking mechanism 66, and an access opening 67.

The port housing 61 has a housing main body 61*a* for partitioning the motor compartment M and the charging port unit 6, and a bracket plate 61*b* for fixing the housing main body 61*a* to the support plate 14*b* of the charging port bracket 14.

The housing main body 61*a* has a forward opening part (front opening part) 61*c* open in the vehicle-forward direction, and a rear opening part 61*d* open in the vehicle rear direction and faced by the port support wall 14*e* of the support plate 14*b*, and is a concave-shaped housing recessed into the motor compartment M. The charging port 62 is disposed on the inside of the housing main body 61*a*, and the port cover 64 is fitted and fixed therein from the forward opening part 61*c* side thereof.

The bracket plate 61*b* is bolted to the port support wall 14*e* via a pair of bracket parts 61*e*, 61*e* fixed to the inside of the housing main body 61*a* and extending into the rear opening part 61*d*. The port lid locking mechanism 65 is fixed to the bracket plate 61*b*.

The charging port 62 has the normal charging port 62*a* and the quick charging port 62*b*, and the two charging ports 62*a*, 62*b* are arranged close together in the vehicle width direction (transverse direction). Each of the charging ports 62*a*, 62*b* is inserted in a through hole formed in the port support wall 14*e* of the support plate 14*b* and is bolted to the port support wall 14*e*. A charging harness 62*c* is extended toward the rear of the vehicle from each of the two charging ports 62*a*, 62*b*.

The normal charging port 62*a* is disposed on the vehicle left side, and an end connection 62*d* for connecting a normal charging connector (not illustrated) is covered by a port cap 62*e* so as to be capable of opening and closing, as illustrated in FIGS. 7A and 7B. The port cap 62*e* pivots in the vehicle-leftward direction about a hinge part 62*f* provided at a position along a peripheral edge part of the end connection 62*d* in the vicinity of a left cover lateral surface 64*b* of the port cover 64. Here, the port cap 62*e* is constantly urged in the opening direction by a spring (not illustrated) provided to the hinge part 62*f*. At a position along the peripheral edge part of the end connection 62*d* in the vicinity of the center part in the width direction of the port cover 64, a release lever 62*g* for engaging with the port cap 62*e* is provided. When the release lever 62*g* is disengaged from the port cap 62*e*, the port cap 62*e* is pivoted by the urging force of the spring, and the end connection 62*d* of the normal charging port 62*a* opens.

A connector engagement recess 62*h* with which a normal charging connector engages when the normal charging connector is connected is formed in a top part of the end connection 62*d*. The connector engagement recess 62*h* is provided to prevent mischief (e.g., on a whim, attempting to pull out the charging connector while passing by).

The quick charging port 62*b* is disposed on the vehicle right side, and an end connection 62*j* for connecting a quick charging connector (not illustrated) is covered by a port cap 62*k* so as to be capable of opening and closing, as illustrated in FIGS. 7A and 7B. The port cap 62*k* pivots toward the vehicle right side about a hinge part 62*m* provided at a position along a peripheral edge part of the end connection 62*j* in the vicinity of a right cover lateral surface 64*c* of the port cover 64. Here, the port cap 62*k* is constantly urged in the opening direction by a spring (not illustrated) provided to the hinge part 62*m*. At a position along the peripheral edge part of the end connection 62*j* in the vicinity of the center part in the width direction of the port cover 64, a release lever 62*n* for engaging with the port cap 62*k* is provided. When the release lever 62*n* is disengaged from the port cap 62*k*, the port cap 62*k* is pivoted by the urging force of the spring, and the end connection 62*j* of the quick charging port 62*b* opens.

The port lid 63 is attached to the port housing 61 via a pair of port lid hinges 63*a*, 63*a*, and covers the forward opening part 61*c* of the port housing 61 so as to be capable of opening and closing. The port lid 63 is shaped so that the surface shape thereof conforms to the front hood 12 of the vehicle front, and when the forward opening part 61*c* is open, the degree of opening of the lid is maintained by the port lid hinge 63*a*. A striker 63*c* is disposed on an inside surface 63*b* of the port lid 63, i.e., to a surface of the port lid 63 facing the inside of the port housing 61.

As illustrated in FIG. 5, the port cover 64 exhibits a concave shape capable of fitting inside the port housing 61, and is integrally fixed to the port housing 61 by a fixing means not illustrated in the drawing. The port cover 64 has a cover rear surface (housing rear surface) 64*a* for covering the rear opening part 61*d*, left and right cover lateral surfaces (housing lateral surfaces) 64*b*, 64*c*, a cover bottom surface 64*d*, and a cover top surface 64*e*.

A parting seal P for enhancing seal properties at a closure position of the port lid 63 is provided on the external periphery of a front opening of the port cover 64 open in the vehicle-forward direction. The parting seal P causes the port lid 63 to pop up by a restorative elastic force when the port lid 63 locked by the port lid locking mechanism 65 is unlocked. The parting seal P is not provided on the top side of the front opening.

A pair of port passage openings 68a, 68a through which the normal charging port 62a and the quick charging port 62b penetrate is formed in the cover rear surface 64a. A port lamp not shown in the drawing for illuminating the inside of the port housing 61 is also disposed at a center part in the vehicle width direction of the cover rear surface 64a.

The left and right cover lateral surfaces 64b, 64c extend in the vehicle-forward direction from left and right end parts of the cover rear surface 64a, respectively, and cover both flanks of the charging port 62. Hinge insertion slits 68b through which the port lid hinges 63a, 63a penetrate are formed in the left and right cover lateral surfaces 64b, 64c.

The cover bottom surface 64d extends in the vehicle-forward direction from a bottom end part of the cover rear surface 64a, and covers from below the charging port 62. An elevated part 68d having a striker groove 68c in which the striker 63c is inserted, and a pair of drain holes 68e, 68e are formed in the cover bottom surface 64d. Here, the elevated part 68d is formed in a center part in the vehicle width direction, and the pair of drain holes 68e, 68e is formed on the two sides thereof.

The cover top surface 64e extends in the vehicle-forward direction from a top end part of the cover rear surface 64a, and covers from above the charging port 62. A guide plate (guide means or device) 69 extending in the vehicle width direction is disposed on the bottom side of the cover top surface 64e. Here, the guide plate 69 protrudes past the cover top surface 64e in the vehicle-forward direction, and is retained so that there is a gap S between the cover top surface 64e and the guide plate 69 (see FIG. 6). The cover top surface 64e and the guide plate 69 are also inclined so that the vehicle-front sides thereof are positioned higher than the vehicle-rear sides thereof.

The guide plate 69 receives water that has flowed into the port housing 61 from the periphery of the port lid 63 and guides the water toward the left and right cover lateral surfaces 64b, 64c. The detailed configuration of the guide plate 69 is described hereinafter.

The port lid locking mechanism 65 engages with the striker 63c in the closure position of the port lid 63 and keeps the port lid 63 closed. The port lid locking mechanism 65 is disposed in an inside bottom part of the port housing 61 and disposed inside the elevated part 68d of the port cover 64.

The electric unlocking mechanism 66 is disposed on a side part of the port housing 61, and unlocks the port lid locking mechanism 65 through use of an electric actuator 66a. As illustrated in FIG. 5, the electric unlocking mechanism 66 has the electric actuator 66a and a wire 66b.

The electric actuator 66a penetrates through and is fixed to a right lateral surface of the housing main body 61a of the port housing 61, and is formed by housing a motor 66c and a reel mechanism 66d inside a waterproof case 66e. The motor 66c of the electric actuator 66a activates on the basis of an operation command from a switch disposed in the passenger compartment space R or a switch provided to a smart key, and causes the reel mechanism 66d to rotate.

One end of the wire 66b is connected to the reel mechanism 66d in the electric actuator 66a, and the other end is connected to a wire connection part 654b formed on a lever 65b of the port lid locking mechanism 65 (see FIG. 6). The wire 66b is wound onto the reel mechanism 66d by the driving of the motor 66c in the electric actuator 66a, and pulls on the lever 65b.

The access opening 67 is formed by making a rectangular cutout in a bottom surface 61f facing in the vehicle-downward direction in the housing main body 61a of the port housing 61, and enables the port lid locking mechanism 65 to be accessed from the compartment opening part 12a. The access opening 67 is thereby set in a region not directly visible from the compartment opening part 12a.

Here, "access" means a manual unlocking operation of the port lid locking mechanism 65 by an operator. The access opening 67 thereby corresponds to a manual unlocking structure for enabling the port lid locking mechanism 65 to be unlocked by a manual operation.

The "region not directly visible" is a region hidden by shadows or bottom sides of other components disposed in the motor compartment M, and that cannot be seen when the compartment opening part 12a is viewed from above the vehicle. The "region not directly visible" includes, for example, a range that is not visible when viewed from above the vehicle but can be seen when looked into using a mirror, camera, or the like.

A lid member 67a for pivoting outside the port housing 61, i.e., toward the motor compartment M, is further provided over the access opening 67. When manually pivoted in the vehicle-downward direction, the lid member 67a opens the access opening 67.

As illustrated in FIG. 6, a manual operation part 652b of the lever 65b of the port lid locking mechanism 65 protrudes from the access opening 67 to the outside of the port housing 61, i.e., into the motor compartment M.

Configuration of the Guide Plate

Figure 8A:
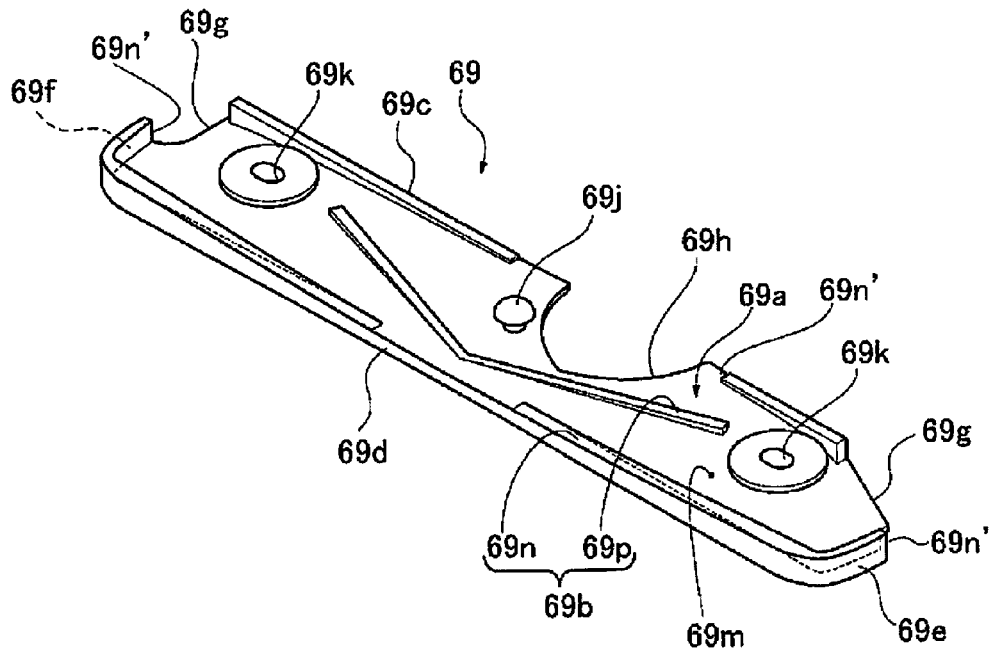
FIG. 8A is a perspective view illustrating the guide plate of Example 1.
Figure 8B:
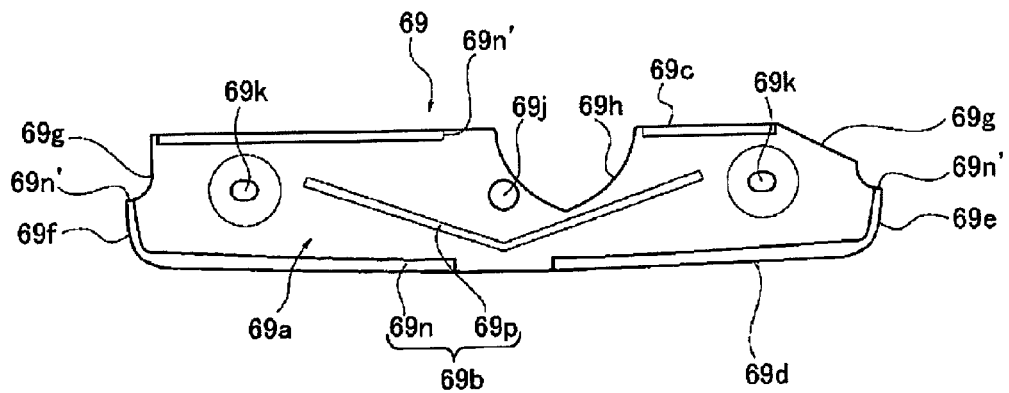
FIG. 8B is a plan view illustrating the guide plate of Example 1.
Figure 8C:
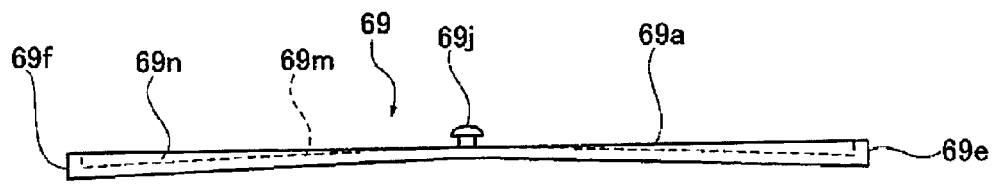
FIG. 8C is a front view illustrating the guide plate of Example 1.

FIGS. 8A through 8C are views illustrating the guide plate of Example 1. FIG. 8A is a perspective view, FIG. 8B is a plan view, and FIG. 8C is a front view. The configuration of the guide plate is described below on the basis of FIGS. 8A through 8C.

The guide plate 69 is a thin plate member made of plastic, and, as illustrated in FIG. 8A, the guide plate 69 has a plate main body 69a and a bead 69b.

The plate main body 69a is a plastic plate extending in the vehicle width direction along the cover top surface 64e. An edge part on one side in the short-length direction of the plate main body 69a is a back-side edge part 69c close to the cover rear surface 64a, and the edge part on the other side in the short-length direction of the plate main body 69a is a lid-side edge part 69d close to the port lid 63. Edge parts on both sides in the longitudinal direction are left and right edge parts 69e, 69f close to the left and right cover lateral surfaces 64b, 64c, respectively.

In the plate main body 69a, cut-out parts 69g, 69g conforming to the inside surface shape of corner parts of the port cover 64 formed by the cover rear surface 64a, the cover top surface 64e, and the left and right cover lateral surfaces 64b, 64c are formed at corners formed by the back-side edge part 69c and the left and right edge parts 69e, 69f, respectively.

A lamp cut-out part 69h for preventing interference with a port lamp (not illustrated) attached to the port housing 61 is also formed in a center part in the vehicle width direction of the back-side edge part 69c.

Furthermore, an engaged projection 69j for engaging with an engaging part (not illustrated) formed on the cover top surface 64e is formed in protruding fashion on a center part of the plate main body 69a. A pair of screw through holes 69k, 69k for fixing the plate main body 69a to the cover top surface 64e is also formed on both sides of the engaged projection 69j.

As illustrated in FIG. 8C, the plate main body 69a has a ridge-shaped inclined surface 69m inclined in the vehicle-downward direction gradually from the center part thereof in the vehicle width direction toward both sides, i.e., toward the left and right edge parts 69e, 69f.

The bead 69b is a projection standing in the vehicle-upward direction from the plate main body 69a, and has a peripheral edge bead 69n and an inside bead 69p. The peripheral edge bead 69n is a bead standing along the peripheral edge part of the plate main body 69a, i.e., along the entire back-side edge part 69c, lid-side edge part 69d, and left and right edge parts 69e, 69f. The peripheral edge bead 69n also has bead breaks 69n' at positions corresponding to the cut-out parts 69g, 69g and the lamp cut-out part 69h.

The inside bead 69p stands in a plate inside portion surrounded by the peripheral edge bead 69n, and extends in the vehicle width direction. Here, the inside bead 69p gradually approaches the cover rear surface 64a progressively toward both end parts from the center part in the vehicle width direction (see FIG. 8B).

The "water guiding action" in the charging port structure of Example 1 will next be described.

Figure 9:
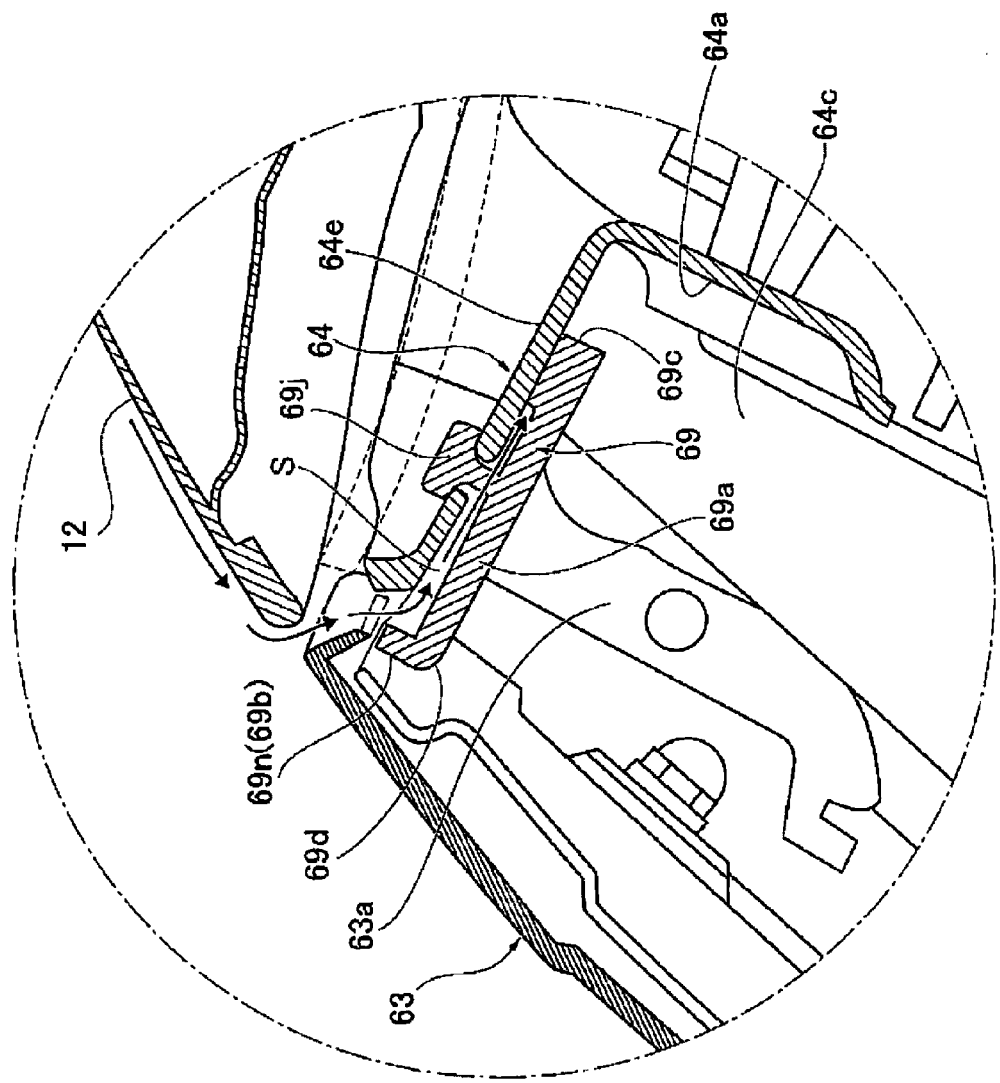
FIG. 9 is an enlarged view in which relevant parts are enlarged to illustrate the flow direction of water flowing down from above the port housing.
Figure 10A:
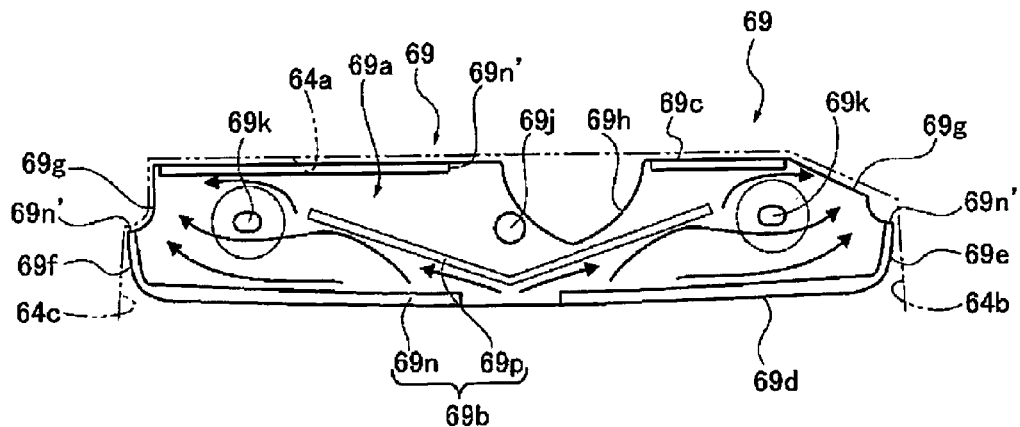
FIG. 10A is a plan view illustrating the direction in which water is guided by the guide plate when water has flowed into the port housing.
Figure 10B:
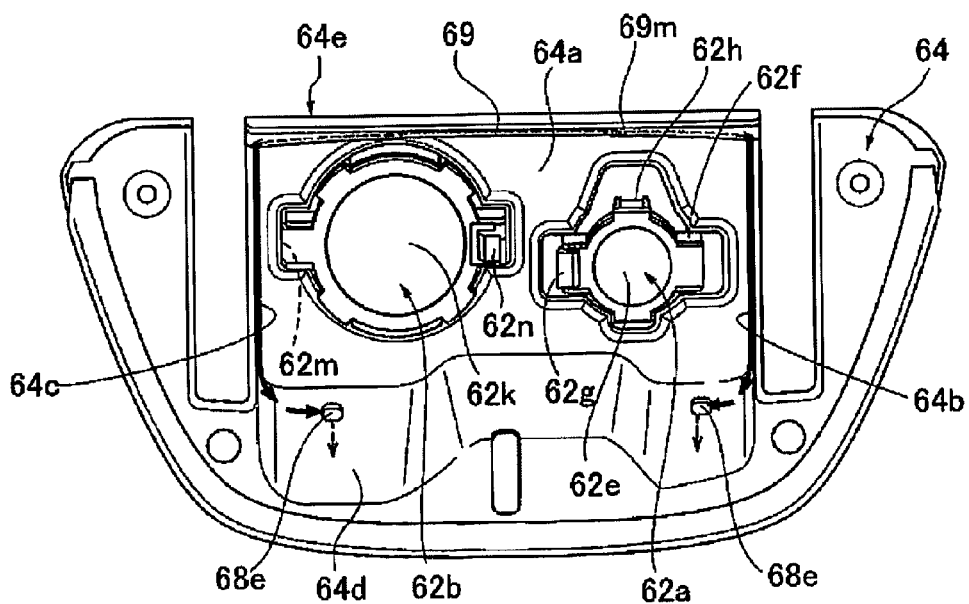
FIG. 10B is a front view illustrating the direction in which water is guided by the guide plate when water has flowed into the port housing.
Figure 10C:
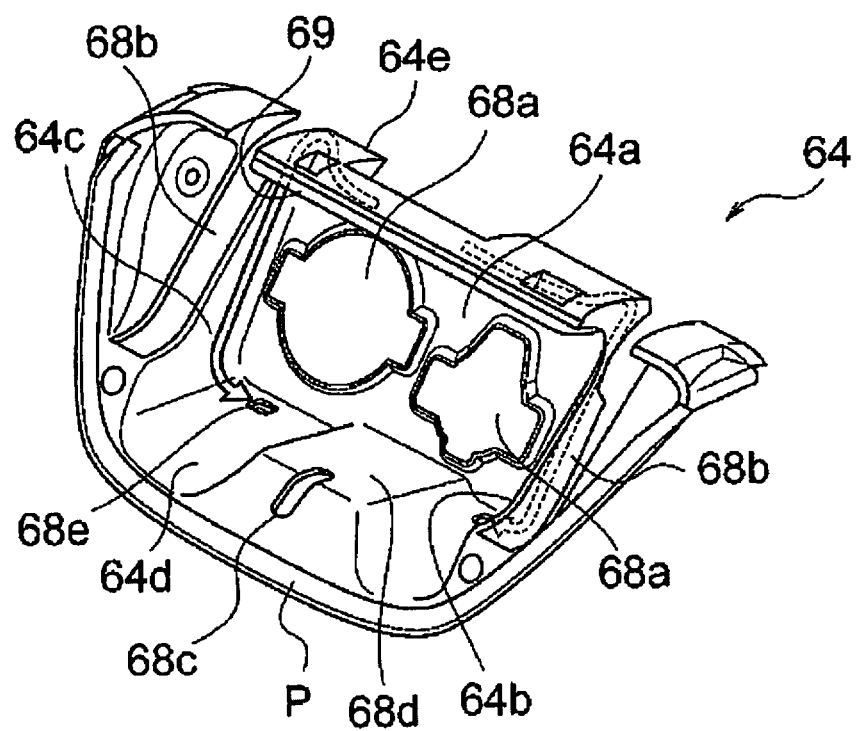
FIG. 10C is a perspective view illustrating the direction in which water is guided by the guide plate when water has flowed into the port housing.

FIG. 9 is a view in which relevant parts are enlarged to illustrate the flow direction of water flowing down from above the port housing. FIGS. 10A through 10C are views illustrating the direction in which water is guided by the guide plate when water has flowed into the port housing, FIG. 10A being a plan view, FIG. 10B being a front view, and FIG. 10C being a perspective view.

In the charging port structure of Example 1, the forward opening part 61c of the port housing 61 for housing the charging port 62 is provided to the vehicle front of the electric automobile 1 and covered by the port lid 63 so as to be capable of opening and closing.

When the forward opening part 61c is blocked by the port lid 63, the port lid 63 is closely contacted by the parting seal P provided on the periphery of the front opening of the port cover 64, and rainwater and other water is prevented from flowing into the port housing 61. However, the parting seal P is not provided at a position corresponding to the top side of the front opening of the port cover 64. Therefore, when water flows down from above the port housing 61 along the front hood 12, it is possible for water to drip down from a gap between the port lid 63 and the forward opening part 61c and enter the port housing 61, as illustrated in FIG. 9.

Also when the forward opening part 61c is opened by the port lid 63, when water flows down from above the port housing 61 along the front hood 12, the water drips into the port housing 61 from the top edge part of the port housing 61.

However, the port cover 64 is fitted and fixed on the inside of the port housing 61, and the guide plate 69 is provided on a bottom side of the cover top surface 64e of the port cover 64. The guide plate 69 protrudes past the cover top surface 64e in the vehicle-forward direction, and is retained so that a gap S is formed between the guide plate 69 and the cover top surface 64e (see FIG. 9).

Through this configuration, when water flowing from above the port housing 61 drips into the port housing 61, the water is received by the guide plate 69 as indicated by the arrow in FIG. 9.

Here, the guide plate 69 is inclined so that the vehicle-front side (lid-side edge part 69d side) thereof is positioned higher than the vehicle-rear side (back-side edge part 69c side) thereof. Water received on the lid-side edge part 69d side therefore flows toward the cover rear surface 64a through the gap S between the guide plate 69 and the cover top surface 64e of the port cover 64. Since the peripheral edge bead 69n also stands on the lid-side edge part 69d, water trickling from the lid-side edge part 69d is dammed, and water is prevented from dripping toward the vehicle-front side from the guide plate 69. Specifically, the water received by the guide plate 69 can be reliably guided toward the cover rear surface 64a.

The plate main body 69a of the guide plate 69 has a ridge-shaped inclined surface 69m inclined in the vehicle-downward direction gradually from the center part thereof in the vehicle width direction toward both sides, i.e., toward the left and right edge parts 69e, 69f (see FIG. 8A). Through this configuration, water received by the guide plate 69 quickly flows toward the left and right edge parts 69e, 69f, and does not remain on the plate main body 69a, as illustrated in FIG. 10A.

The inside bead 69p gradually approaching the cover rear surface 64a progressively toward both end parts from the center part thereof in the vehicle width direction is also formed on the plate main body 69a. Through this configuration, water flowing over the plate main body 69a can detour toward the left and right edge parts 69e, 69f on the way to the cover rear surface 64a rather than flowing directly toward the cover rear surface 64a. Specifically, the momentum of water flowing over the plate main body 69a is suppressed by the inside bead 69p, water is prevented from overflowing from the plate main body 69a, and the water can be channeled smoothly.

The peripheral edge bead 69n also stands on the back-side edge part 69c and the left and right edge parts 69e, 69f of the plate main body 69a. Water trickling from left and right edge parts 69e, 69f or the back-side edge part 69c is therefore dammed, and water is prevented from dripping laterally or toward the vehicle-rear side from the guide plate 69.

Water flowing toward the cover rear surface 64a from the left and right edge parts 69e, 69f continues to flow toward the cut-out parts 69g, 69g. At this time, the cut-out parts 69g, 69g have the bead breaks 69n' in which the peripheral edge bead 69n is not formed. Water therefore trickles in the vehicle-downward direction from the gaps between the cut-out parts 69g, 69g and the corner parts of the port cover 64. Since the gap between the port cover 64 and the guide plate 69 is extremely small, water flowing downward from the guide plate 69 flows along the port cover 64.

As illustrated in FIGS. 10B and 10C, the water flows toward the cover bottom surface 64d from the corner parts formed by the cover rear surface 64a and the left and right cover lateral surfaces 64b, 64c, and is discharged to the outside of the port housing 61 through the drain holes 68e, formed in the cover bottom surface 64d.

Water flowing into the port housing 61 is thus received by the guide plate 69 before trickling into the port housing 61, is guided toward the corner parts formed by the left and right cover lateral surfaces 64b, 64c and the cover rear surface 64a of the port cover 64, and subsequently flows along the cover bottom surface 64d from the corner parts, and is discharged through the drain holes 68e.

In the charging port structure of Example 1, the end connections 62d, 62j of the normal charging port 62a and the quick charging port 62b of the charging port 62a are covered by the port caps 62e, 62k, respectively. Here, the release levers 62g, 62n for opening the port caps 62e, 62k are disposed in the center part in the vehicle width direction of the port housing 61. Specifically, the release lever 62g of the port cap 62e for covering the normal charging port 62a and the release lever 62n of the port cap 62k for covering the quick charging port 62b are disposed close to each other in the center part in the vehicle width direction of the port housing 61.

The guide plate 69 therefore receives water that has flowed into the port housing 61 before the water trickles onto the inside of the port housing 61, and guides the water away from where the release levers 62g, 62n are disposed.

The release levers 62g, 62n of the charging port 62 are thereby prevented from being exposed to water, and opening of the release levers 62g, 62n is prevented from becoming difficult even when the water freezes.

In the charging port structure of Example 1, the release levers 62g, 62n are each disposed in the center part in the vehicle width direction of the port housing 61. The water received by the guide plate 69 is guided toward the corner parts formed by the left and right cover lateral surfaces 64b, 64c and the cover rear surface 64a of the port cover 64, i.e., toward the sides of the port housing 61.

It is therefore possible to make traces of water flows on the port cover 64 less noticeable and enhance the attractiveness of the appearance of the charging port structure while preventing the release levers 62g, 62n from being exposed to water.

The connector engagement recess 62h is formed in a top part of the end connection 62d of the normal charging port 62a, but by providing the guide plate 69 in a position above the charging port 62, the connector engagement recess 62h is also made less prone to water exposure. It is therefore possible to prevent a situation in which it is difficult to connect a charging connector to the normal charging port 62a when water on the connector engagement recess 62h freezes, for example.

The guide plate 69 has the plate-shaped plate main body 69a provided above the charging port 62, and the bead 69b standing on the top surface of the plate main body 69a. Water that has flowed into the port housing 61 is therefore received by the plate main body 69a, the flow direction of water flowing over the plate main body 69a can be restricted by the bead 69b, and the water can be appropriately guided in the desired direction.

In Example 1 in particular, the bead 69b has the peripheral edge bead 69n standing on the peripheral edge part of the plate main body 69a, and the inside bead 69p standing on the inside of the peripheral edge bead 69n. The bead breaks 69n' are also formed in the peripheral edge bead 69n at positions facing the corner parts formed by the cover rear surface 64a and the left and right cover lateral surfaces 64b, 64c of the port cover 64. The inside bead 69p also gradually approaches the cover rear surface 64a progressively toward both end parts from the center part in the vehicle width direction while extending in the width direction of the port housing 61.

Therefore, water received by the guide plate 69 can be prevented from flowing down in the vehicle-forward direction past the plate main body 69a, and water can be reliably channeled between the corner parts and the plate main body 69a. Furthermore, the momentum of water flowing over the plate main body 69a is suppressed by the inside bead 69p, water is prevented from overflowing from the plate main body 69a, and the water can be channeled smoothly.

The ridge-shaped inclined surface 69m inclined in the vehicle-downward direction gradually toward both sides from the center part in the vehicle width direction of the port housing 61 is also formed in the plate main body 69a of the guide plate 69. Water received by the guide plate 69 therefore rapidly flows toward the sides of the guide plate 69, and water is prevented from remaining on the plate main body 69a.

Effects will next be described

In the charging port lid structure of Example 1, the effects cited below can be obtained.

(1) Provided are:

a charging port (normal charging port 62a, quick charging port 62b) having end connections 62d, 62j to which charging connectors are connected for supplying electric power from an outside power source;

a port housing 61 surrounding the charging ports 62a, 62b;

a port lid 63 for covering a forward opening part (front opening part) 61c of the port housing 61 so as to be capable of opening and closing;

port caps 62e, 62k for covering the end connections 62d, 62j of the charging ports 62a, 62b so as to be capable of opening and closing;

release levers 62g, 62n for opening the port caps 62e, 62k, the release levers 62g, 62n being provided to peripheral edge parts of the end connections 62d, 62j of the charging ports 62a, 62b; and guide means (a guide plate or device) 69 for receiving water that has flowed into the port housing 61 from the periphery of the port lid 63 and guiding the water away from where the release levers 62g, 62n are provided, the guide means 69 being disposed above the charging ports 62a, 62b.

Through this configuration, the release levers 62g, 62n of the port caps 62e, 62k can be prevented from being exposed to water even when water flows into the port housing 61.

(2) The release levers 62g, 62n are provided at the center part in the width direction of the port housing 61; and the guide means (guide plate or device) 69 guides water that has flowed into the port housing 61 toward the sides (left and right cover lateral surfaces) 64b, 64c of the port housing 61.

Through this configuration, the release levers 62g, 62n can be prevented from being exposed to water, and traces of water flows on the port cover 64 can be made less noticeable.

(3) The guide means (guide plate or device) 69 has a plate-shaped plate main body 69a provided above the charging port 62, and a bead 69b standing on a top surface of the plate main body 69a.

Through this configuration, water can be received by the plate main body 69a, the flow direction of water flowing over the plate main body 69a can be restricted by the bead 69b, and the water can be appropriately guided in the desired direction.

(4) The port housing 61 has a housing rear surface (cover rear surface) 64a through which the charging port 62 passes, and housing lateral surfaces (left and right cover lateral surfaces) 64b, 64c extending from both sides of the cover rear surface 64a and covering the sides of the charging port 62; and the bead 69b stands on a peripheral edge part of the plate main body 69a and has: a peripheral edge bead 69n in which bead breaks 69n' are formed at positions facing corner parts formed by the cover rear surface 64a and the left and right cover lateral surfaces 64b, 64c; and an inside bead 69p standing on the inside of the peripheral edge bead 69n, and gradually approaching the cover rear surface 64a progressively toward both end parts from the center part in the vehicle width direction while extending in the width direction of the port housing 61.

Through this configuration, received water can be prevented from flowing down in the vehicle-forward direction past the plate main body 69a, and water can be reliably channeled toward the corner parts formed by the cover rear surface 64a and the left and right cover lateral surfaces 64b, 64c. Furthermore, the momentum of water flowing over the plate main body 69a is suppressed by the inside bead 69p, water is prevented from overflowing from the plate main body 69a, and the water can be channeled smoothly.

(5) The guide means (guide plate or device) 69 has a plate-shaped plate main body 69a disposed above the charging port 62, and an inclined surface 69m formed on the plate main body 69a.

Through this configuration, water can be received by the plate main body 69a, the received water can be rapidly channeled, and water can be prevented from remaining on the plate main body 69a.

(6) The inclined surface 69m has a ridge shape inclined in the vehicle-downward direction gradually from the center part in the vehicle width direction of the port housing 61 toward both sides thereof.

Through this configuration, water received by the plate main body 69a can be rapidly guided toward the sides of the port housing 61.

The charging port lid structure of the present invention is described above on the basis of Example 1, but the specific configuration thereof is not limited by the example, and various design changes or additions may be made thereto insofar as such changes or additions do not deviate from the gist of the invention as recited in the claims.

In Example 1, the charging port 62 of the charging port unit 6 is described as having a normal charging port 62a and a quick charging port 62b. However, this configuration is not limiting, and the charging port 62 may also have a single charging port. In this case as well, guiding water away from where a release lever for opening a port cap is disposed makes it possible to prevent the release lever from being exposed to water.

In Example 1, the guide plate 69 is described as having an inclined surface 69m and a bead 69b having a peripheral edge bead 69n and an inside bead 69p. However, the guide plate 69 may also be configured so as to have only the bead 69b or the inclined surface 69m. The guide plate 69 may also be configured so as to have only the peripheral edge bead 69n or only the inside bead 69p. The inclined surface 69m may also be inclined progressively toward any one of the left and right edge parts 69e, 69f.

In Example 1, the charging port lid structure is described as being applied to an electric automobile 1 in which the travel drive source uses only electricity, but this configuration is not limiting, and the charging port lid structure may also be applied to a plug-in hybrid vehicle having a motor and an engine as drive sources. Specifically, the charging port lid structure may be applied to any electric vehicle having a charging port.

The invention claimed is:

1. A charging port structure comprising:
    a charging port having an end connection configured to have a charging connector for supplying electric power from an outside power source connected thereto;
    a port housing surrounding the charging port;
    a port lid configured to cover the front opening part of the port housing so as to be capable of opening and closing;
    a port cap configured to cover the end connection of the charging port so as to be capable of opening and closing;
    a release lever configured to open the port cap, the release lever being disposed on a peripheral edge part of the end connection of the charging port;
    a port cover disposed inside the port housing and having a cover top surface; and
    a guide device configured to receive water that has flowed into the port housing from the periphery of the port lid and guide the water away from the release lever, the guide device being disposed above the charging port, the guide device extending in a vehicle width direction and protruding past the cover top surface such that a gap is formed between the cover top surface and the guide device.

2. The charging port structure of claim 1, wherein
    the release lever is disposed at a center part in a width direction of the port housing; and
    the guide device is configured to guide water that has flowed into the port housing toward sides of the port housing.

3. The charging port structure of claim 1, wherein
    the guide device has a plate-shaped plate main body disposed above the charging port, and a bead standing on a top surface of the plate main body.

4. The charging port structure of claim 3, wherein
    the port housing has a housing rear surface through which the charging port passes, and housing lateral surfaces extending from both sides of the housing rear surface and covering sides of the charging port; and
    the bead stands on a peripheral edge part of the plate main body and has a peripheral edge bead in which bead breaks are disposed at positions facing corner parts formed by the housing rear surface and the housing lateral surfaces; and
    an inside bead standing on an inside of the peripheral edge bead, and approaching the housing rear surface progressively toward both end parts from a center part in the vehicle width direction while extending in a width direction of the port housing.

5. The charging port structure of claim 1, wherein
    the guide device has a plate-shaped plate main body disposed above the charging port, and an inclined surface disposed on the plate main body.

6. The charging port structure of claim 5, wherein
    the inclined surface has a ridge shape inclined in a vehicle-downward direction gradually from the center part in a vehicle width direction of the port housing toward both sides thereof.

7. The charging port structure of claim 2, wherein
    the guide device has a plate-shaped plate main body disposed above the charging port, and a bead standing on a top surface of the plate main body.

8. The charging port structure of claim 2, wherein
    the guide device has a plate-shaped plate main body disposed above the charging port, and an inclined surface disposed on the plate main body.

9. The charging port structure of claim 3, wherein
    the guide device has a plate-shaped plate main body disposed above the charging port, and an inclined surface disposed on the plate main body.

10. The charging port structure of claim 4, wherein
    the guide device has a plate-shaped plate main body disposed above the charging port, and an inclined surface disposed on the plate main body.

* * * * *